United States Patent [19]
Hofer

[11] 3,762,480
[45] Oct. 2, 1973

[54] HYDRAULIC CONTROL APPARATUS FOR MAINTAINING AN AGRICULTURAL IMPLEMENT PARALLEL TO THE GROUND SURFACE

[75] Inventor: Friedrich Wilhelm Hofer, Hoefingen, Germany

[73] Assignee: Robert Bosch GmbH, Stuttgart, Germany

[22] Filed: Feb. 22, 1971

[21] Appl. No.: 117,294

[30] Foreign Application Priority Data
Feb. 21, 1970  Germany ................. P 20 08 051.7

[52] U.S. Cl. .................... 172/4, 172/294, 172/445, 280/414.5, 172/328
[51] Int. Cl. ............................................... A01b 63/111
[58] Field of Search .................... 172/4, 294, 4.5, 172/413, 285, 318, 319, 395, 411, 483, 487, 445, 328, 324, 326, 327, 465; 280/414.5, 446 A; 90/50 HE

[56] References Cited
UNITED STATES PATENTS

| | | | |
|---|---|---|---|
| 3,035,645 | 5/1962 | Wilson et al. | 172/4 UX |
| 3,583,495 | 6/1971 | Cantral et al. | 172/413 X |
| 2,830,519 | 4/1958 | Chandler et al. | 172/294 X |
| 3,610,103 | 10/1971 | Adams et al. | 60/52 HE |
| 3,139,943 | 7/1964 | Evans et al. | 172/445 |

Primary Examiner—Robert E. Pulfrey
Assistant Examiner—Stephen C. Pellegrino
Attorney—Michael S. Striker

[57] ABSTRACT

An agricultural implement, drawn by a tractor, is supported at the front and rear ends by front and rear cylinder and piston means, respectively. When the front end of the implement is raised, or lowered, by the front cylinder and piston means, fluid is automatically supplied to, or discharged from, respectively, the rear control cylinder and piston means for maintaining the implement in a position parallel to the ground surface.

11 Claims, 5 Drawing Figures

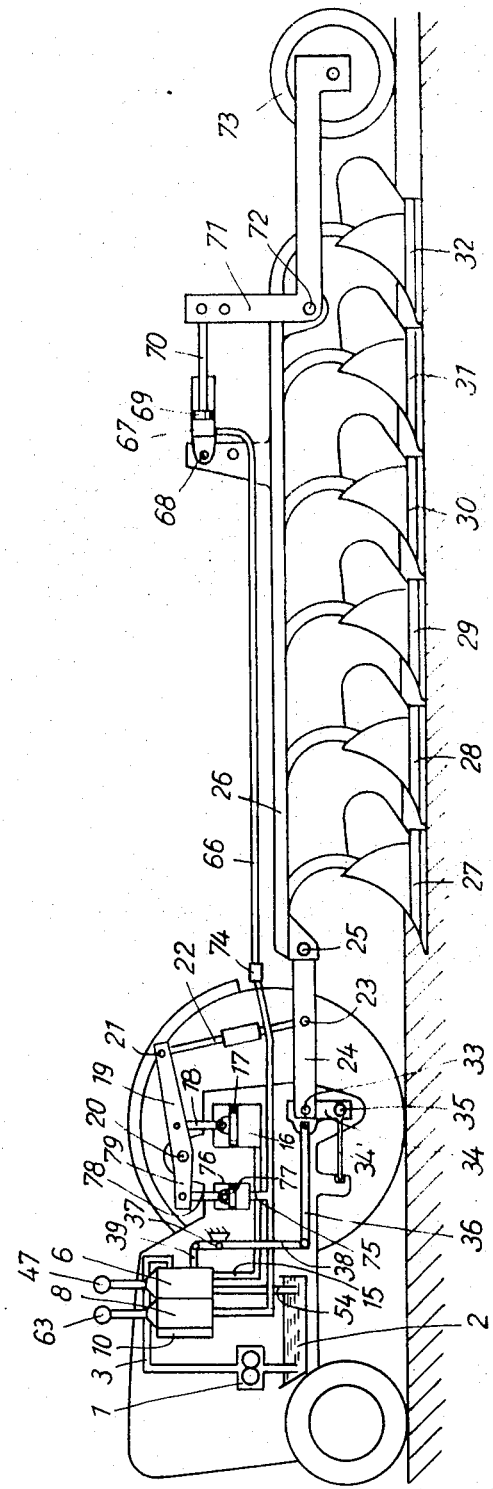

INVENTOR:
Friedrich Wilhelm HÖFER

BY

Michael S. Striker
his ATTORNEY

INVENTOR:
Friedrich Wilhelm HÖFER

BY

Michael P. Stuber
his ATTORNEY

HYDRAULIC CONTROL APPARATUS FOR MAINTAINING AN AGRICULTURAL IMPLEMENT PARALLEL TO THE GROUND SURFACE

BACKGROUND OF THE INVENTION

The present invention relates to a hydraulic control apparatus for an agricultural implement whose rear end is movably supported on the ground, while its front end is attached to a tractor and supported on the same.

The German patent 1,189,771 discloses an implement having front and rear end supporting cylinder and piston means, and a control apparatus which connects the rear supporting cylinder means either with the front supporting cylinder means, or with the return conduit for the pressure fluid, or effects blocking of the rear support cylinder means. The purpose of the apparatus is that all plow shares of a multiple plow are placed in the ground, or lifted from the ground, at the same distance from the border of the respective plowed field. However, it is important for agricultural implements of this type that all plow shares operate at the same depth, and that the comparatively long implement is maintained parallel to the ground surface.

SUMMARY OF THE INVENTION

One object of the invention is to provide a hydraulic control apparatus for maintaining a tractor-drawn agricultural implement in a position parallel to the ground surface, so that all tools on the same operate at the same depth.

Another object of the invention is that during the turning of the implement at the border of the field, the implement can be raised and again lowered to an operative position by operation of the control apparatus.

Another object of the invention is that the rear end of the implement is raised, or lowered, at a certain delay when the front end of the implement is raised, or lowered, so that all tools enter the ground, or are raised from the same, at the same distance from the border of the field.

With these objects in view, the rear support cylinder of the implement is connected by a control conduit with a hydraulic control device which is arranged between the source of pressure fluid, and a discharge container from which the fluid is pumped.

The control conduit also communicates with a control cylinder whose piston is connected with the front supported piston. The front control piston and the rear control piston may be connected by a linkage to move in opposite directions, but it is also possible to combine the front and rear control pistons in a single piston, which forms the front and rear chambers on opposite sides thereof in the same cylinder.

Preferably, the chamber in which the piston rod is located, serves as rear control chamber.

It is advantageous to provide means for delaying the raising and lowering of the rear end of the implement relative to the raising and lowering of the front end. In the control conduit between the rear cylinder and the rear control cylinder, an adjustable delay element is provided, while the rear control piston is biased.

An embodiment of the hydraulic control apparatus comprises movable rear supporting means, such as a lever having a wheel at the end, mounted on the trailing end of an agricultural implement for supporting the same on the ground for up and down movement; hydraulic rear support cylinder means and piston means mounted on the implement and having a movable member, for example the rear support piston means, for operating the rear supporting means to raise and lower the trailing end; the hydraulic rear end adjusting device including manually operated rear end control valve means operable to supply pressure fluid to, and discharge fluid from the rear support cylinder means for actuating the movable member; movable front supporting means mounted on a tractor for supporting the leading end of the implement on the tractor for up and down movement; control cylinder means and control piston means forming a rear control chamber connected with the rear support cylinder means, and a front control chamber, the control piston means being operatively connected with the front supporting means by a linkage; and a hydraulic control device including manually operated front control valve means operable to supply pressure fluid to, and discharge fluid from the front control chamber.

The control piston means can be operated to actuate the front supporting means to raise and lower, respectively, the leading end of the implement, and to simultaneously vary the volume of the rear control chamber for supplying fluid to, and receiving fluid from the rear support cylinder means so that the movable member operates the rear supporting means. Consequently, the leading and trailing ends of the implement are simultaneously and automatically raised and lowered, and the implement remains parallel to the ground surface.

The novel features which are considered as characteristic for the invention are set forth in particular in the appended claims. The invention itself, however, both as to its construction and its method of operation, together with additional objects and advantages thereof, will be best understood from the following descriptions of specific embodiments when read in connection with the accompanying drawing.

BRIEF DESCRIPTION OF THE DRAWING

FIG. 1 is a schematic side elevation illustrating a first embodiment of the invention;

FIG. 2 is a fragmentary elevation, partially in section, illustrating a modification of the embodiment of FIG. 1 and 1a;

DESCRIPTION OF THE PREFERRED EMBODIMENTS

Figure 1A:
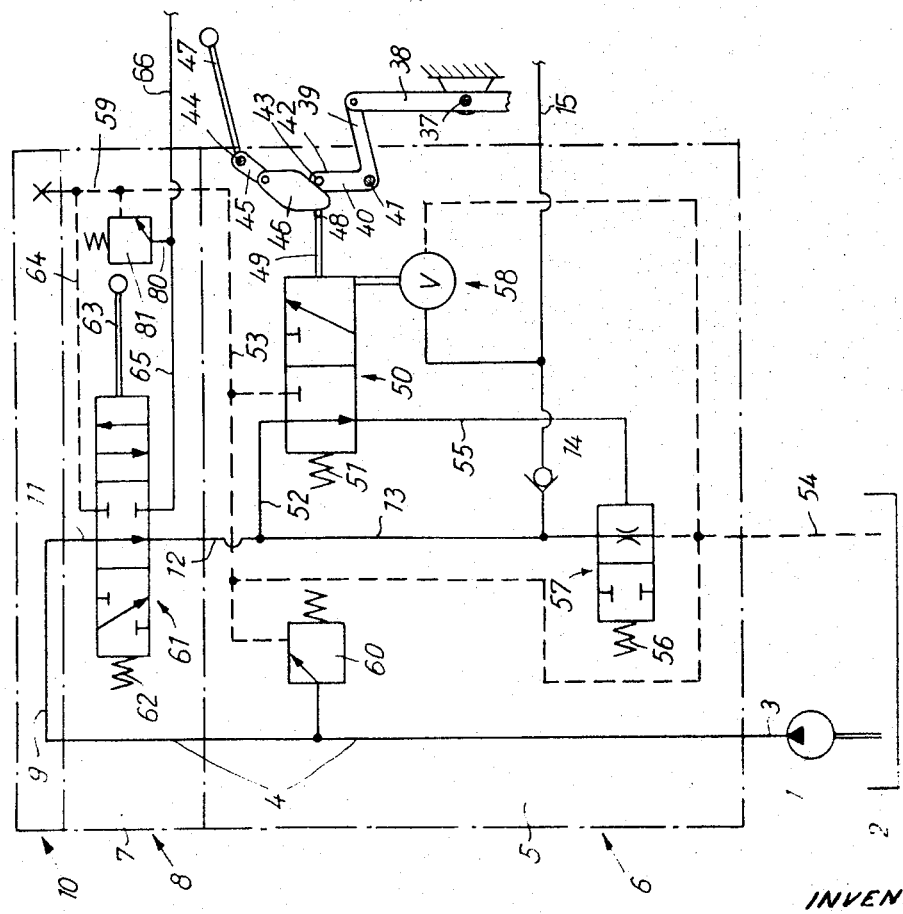
FIG. 1a is a schematic diagram illustrating part of the hydraulic control apparatus used in the embodiment of FIG. 1.

Referring first to the embodiments of FIGS. 1 and 1a, the hydraulic circuit, which is shown schematically in FIG. 1, is only partly shown in FIG. 1a. A motor driven pump 1 pumps pressure fluid from a return container 2 into a pressure conduit 3 which opens into a pressure conduit 4 which passes through the housing 5 of a hydraulic control device 6, and through the housing 7 of the rear end adjusting device 8 and finally into an end cover 10, see FIG. 1, in which a pressure conduit 9 establishes a connection between pressure conduit 4 and another pressure conduit 11 in the housing 7 of the rear end adjusting device 8. Pressure conduit 11 is continued in a pressure conduit 12 in housing 5 which communicates with a working conduit 13 which is connected by check valve 14 with a control conduit 15. Control conduit 15 opens into a front control cylinder 16 in the front control chamber of the same. The front control piston 17 is slidingly guided in sealed contact in front control cylinder 16, and has a piston rod 18 pivotally connected with a lever 19 which is fixedly mounted on a shaft 20 supported on the tractor.

Tee rear end of lever 19 is connected by pivot 21 with a link 22 which is pivotally connected with another link 24 whose rear end is pivotally connected at 25 with the front end of the frame 26 of a multiple plow which includes six plow shares 27 to 32. The lower link 24 is connected with a measuring device 34 which responds to variation of the pulling force acting on the plow or other agricultural implement. Measuring device 34 has a form of an arm pivotally mounted on a pivot 35 on the tractor. Integral with the arm is a leaf spring 34′ the outer end of which is held in a slot of a bracket fixed to the tractor. The rod 36 is connected with measuring device 34, and pivotally connected with the lower end of an elongated lever 38 which is mounted on a pivot 37 on the tractor. The upper end of lever 38 is pivotally connected with the arm 39 of angular lever 40 which is mounted on a pivot 41 supported by the housing 5. The other arm 42 has a projecting stud 43 cooperating with a cam 46 which is pivotally mounted on a lever 45 turnable about a pivot 44, mounted on housing 5, and being controlled by a handle 47, as best seen in FIG. 1a, but also partly shown in FIG. 1.

Cam 46 cooperates not only with the stud 43 of angular lever 40, but also with a stud 48 on a control rod 49 which is connected with a presetting valve slide 50 which is mounted in housing 5 for longitudinal movement, and abuts a spring 51, also mounted in housing 5 of the hydraulic control device 6. A conduit 52 branches off conduit 13, and is connected with a port controlled by presetting valve slide 50. A return conduit 53 also has a port cooperating with valve slide 50, return conduit 53 being connected with a discharge conduit 54 opening into container 2 from which pump 1 pumps returned fluid.

In the position shown in FIG. 1, the presetting valve slide 50 connects the pressure conduit 52 with an operating conduit 55 whose pressure controls the shifting of a main valve 57 which abuts the biasing spring 56 and can be shifted in accordance with the hydraulic pressure in conduit 55 between two positions. The main valve 57 is also connected with pressure conduit 13, and return conduits 53 and 54.

In the illustrated position of main valve 57, pressure conduit 13 is connected with return conduit 53,54 by a throttle. In the other position of main valve 57, pressure conduit 13 is separated from return conduit 53,54.

In the shifted position of presetting valve slide 50, pressure conduit 52 is closed, and conduit 55 is connected with return conduit 53,59.

A lowering valve 58 is mechanically connected with presetting valve slide 50, and operating together with the same. Lowering valve 58 is connected with conduits 13 and 15, and also connected with the return conduit 53 in housing 5. Between pressure conduit 4 and return conduit 53, a pressure limiting valve 60 is provided in housing 5 to limit the pressure in the apparatus for safety reasons.

The housing 7 of the rear end adjusting device 8 supports a rear end control valve slide 61 which abuts a spring 62 mounted in housing 7, and is shiftable by manually operated lever 63 between three positions for raising, lowering, and maintaining the rear end of the implement.

In the neutral position shown in FIG. 1a, valve slide 61 connects pressure conduit 11 with pressure conduit 12 of the control device 6. A duct 64 communicating with the return conduit 59 is closed, and a duct 65 which communicates with a conduit 66, is also closed. Conduit 66 opens into a rear support cylinder 67 which is pivotally mounted at the rear end of the plow frame 26 on a pivot 68. A rear support piston 69 is slidably mounted in rear support cylinder 67 and has a piston rod 70 pivotally connected with a rear support lever means 71 which is mounted on pivots of plow frame 26 for up and down movement. The rear end of rear supporting lever 71 mounts a wheel 73 resting on the ground surface.

In the right-end position of rear support rear end control valve slide 61, pressure conduit 11 is connected by slide 61 with the conduit 66 so that the piston 69 is to raise the trailing end of the implement 26. In the lowering position, which is the left-end position of slide 61, pressure conduits 11 and 12 are connected, and conduit 65 is connected with return conduit 64, communicating with the return conduit 59.

In the control conduit 66, which is connected with the rear support cylinder 67, a tubular coupling 74 is provided so that the pressure fluid cannot flow out of rear support cylinder 67 when the implement is disconnected from the trailer.

Between the rear end adjusting device 8, and the tubular coupling 74, a branch conduit 75 is connected with the rear control cylinder 76, see FIG. 1, which is mounted on the trailer. In the rear control cylinder 76, a rear control piston 77 is mounted for sliding movement, and has a piston rod 78 pivotally connected with an arm 79 which extends lever 19 beyond shaft 20. A pressure limiting valve 81, opening into return conduit 59, is provided between the conduit 18 communicating with the control conduits 65,66, and the return conduit 59, and loaded by a spring so as to serve as a safety valve when the rear support piston 69 is in the end position in which the rear end of the implement is raised, and presetting valve is operated to supply fluid to front control cylinder 16.

When the plow frame 26 is attached to the tractor before a plowing operation, the tubular coupling 74 connects the rear control conduit 66 and rear support cylinder 67 with the rear end adjusting device 7 and the hydraulic control device 6. Since the implement is comparatively long due to the many plow shares 27 to 32, it is important to hold the implement at least substantially parallel to the ground surface in order to obtain the same plowing depth, and to move the implement parallel to the ground surface when the plowing depth is varied during a plowing operation. The rear end adjusting device 8 serves this purpose. If, for example, the rear end of the implement is located higher above the ground surface than the front end which is connected with the trailer, the operator moves handle 63 of the rear control valve means 61 to move the same to the left into the lowering position. The control conduit 65,66 and rear support cylinder 67 are connected with the return conduit means 64,59,53,54, so that pressure fluid flows out of rear support cylinder 62 into container 2 until the trailing end of the implement has been lowered to the same level at which the leading front end is located, so that the implement is parallel to the ground surface. When this position is obtained, the operator shifts the rear control valve means back to the neutral position so that the rear end support cylinder 67 is again disconnected from the return conduit means and from the pressure conduit 11.

If due to the operation of the tubular coupling 74, or due to leakage losses, pressure fluid escapes from the rear end support cylinder 67, and rear end support piston 69 moves so far into cylinder 67 that the rear end of the plow frame 26 is lower than the front end which is connected with the trailer, the operator actuates handle 63 to move the rear end control valve slide 61 at the right to the raising position.

Pressure fluid pumped by pump 1 flows through the pressure conduits 3,4,9,11, through rear end control valve slide 61, control conduit 65,66 into rear end support cylinder 62, and displaces piston 69. The rear supporting lever 71, which is connected with piston rod 70, turns about pivot means 72 at the trailing end of implement 26 in clockwise direction so that the trailing end of the implement is raised to the level at which the front end is held on the tractor. Thereupon, the operator moves rear end control valve slide 61 back to the neutral position, so that the rear end support cylinder 67 is closed.

It will be seen that the rear end adjusting device 8 is capable of adjusting the rear end of the implement until it is located at the level of the front end, in which position the implement is maintained during operations.

This adjustment is not only carried out after coupling the implement with the tractor, but also used during plowing operation on the field if, for example, leakage losses occur, or if the tractor, due to its great weight, sinks deeper into the ground, whereby the leading end of the implement is lowered. Furthermore, due to the parallel raising and lowering of the implement, the desired plowing depth in the ground, and also a transporting position above the ground surface, can be obtained quicker, and while the tractor moves a shorter distance with the implement.

On the other hand, the hydraulic control device 6 is used for setting the desired magnitude of a pulling force corresponding to a predetermined plowing depth. Upon deviations from the desired plowing depth, which may be caused by variation of the texture of the ground, the implement is adjusted to the desired plowing depth.

When the implement is to be lowered from a raised transporting position spaced from the ground, to a working position which the plow shares engage the ground, the operator moves handle 67 of the presetting valve 50 of the hydraulic control device 6 in the direction for lowering the implement. Pressure fluid pumped by pump 1 flows through conduits 3,4,9,11,12, and 13, and through the main valve 57 into the return conduit 53,54. At the same time, the presetting valve 50 opens the lowering valve 58 so that the front control cylinder 16 is connected by conduit 15, and the open valve 58, directly with return conduit 54, so that fluid can flow out of front control cylinder 16 which results in downward movement of the front control piston 17, while lever means 19 turn in clockwise direction about shaft 20. The front supporting means 22,24 are lowered so that the leading end of the implement 26 is lowered with pivot 25.

Due to the angular movement of lever means 19 about shaft 20 in clockwise direction, piston rod 78 and rear control piston 77 are displaced to increase the volume of the rear control chamber in cylinder 76. Since rear control chamber in cylinder 76 is connected by control conduit 66 directly with the rear end support cylinder 67, pressure fluid flows from rear end support cylinder 67 into the rear control cylinder 76. Rear support piston 69 moves into the rear support cylinder 67 and turns by means of piston rod 70, the rear end supporting means 71,73 in counterclockwise direction about the axis of the support wheel 73 so that the trailing end of the implement 26 is also lowered.

When the pulling force set by actuation of the handle 47, and the corresponding plowing depth are reached, the measuring device 34, which is connected with the lower links 24, has turned in clockwise direction about pivot 35 on the trailer, so that the linkage 36,38,39,46,49, effects return of presetting valve 50 to a neutral position. The lowering valve 58 is then again closed, and front control cylinder 16 is also closed, so that the plow shares 27 to 32 are held at the desired plowing depth.

If greater forces occur at the plow shares 27 to 32, which exceed the desired value of the pulling force exerted by the tractor, and previously selected by manual operation of the rear end control valve means 61 of the rear end adjusting device 8, the measuring device 34 is turned by links 24 farther in clockwise direction about its pivot 35, so that the linkage means 36,38,39,40,49, perform a corresponding movement so that the presetting valve 50 is shifted against the force of spring 51 to the left to a raising position. In this position, pressure fluid pumped by pump 1 flows through conduits 3,4,9,11,12,13, the opening check valve 14, and control conduit 15 into the front control cylinder 16, since in the raising position of presetting valve 50, conduit 55 at the main valve 57 is connected with the return conduit 53, so that main valve 57 is held by spring 56 in its other end position in which main valve 57 separates the pressure conduit 13 from the return conduit 53,54. Front control piston 17 is moved outward in front control cylinder 16, and its piston rod 18 turns the lever means 19 in counterclockwise direction about shaft 20, so that the leading end of the implement is raised by links 22 and 24. At the same time, during the turning of the lever means 19 in counterclockwise direction about shaft 20, the arm 79 moves piston rod 78 and rear control piston 77 into the rear control cylinder 76. Pressure fluid is pressed out of rear control cylinder 76 through control conduit 66 and into the rear support cylinder 67. The rear support piston 69 moves outward in rear support cylinder 67, so that piston rod 70 and rear supporting means 71, 73 raise the trailing end of the implement. The plowing depth of plow shares 27 to 32 is reduced, and the pulling force acting through the lower links 24 and the measuring device 34 is reduced.

When the implement is raised so high that the force acting on the plow shares 27 to 32 again corresponds to the selected pulling force adjusted by means of lever 47, the measuring device 34 turns in clockwise direction back to a neutral position, moving the linkage means 36,38,39,46, also toward a neutral position. The spring 51 pulls the presetting valve 50 in a position in which control rod 49 and stud 48 abut cam 46, so that presetting valve 50 returns to its neutral position, in which the front control cylinder 16 is disconnected from the flow of pressure fluid. Conduit fluid. Conduit is again connected with the pressure conduits, so that pressure fluid holds main valve 57 against the action of spring 36 in the open position shown in FIG. 1a in which the implement is neither raised nor lowered.

The adjustment of the rear supporting means for placing a long agricultural implement in a position parallel to the ground during raising and lowering, is not only advantageous when the hydraulic control device is operated depending on the pulley force. The hydraulic control apparatus of the invention can also be used for arrangement in which the position of the implement is adjusted in accordance with its position, or in accordance with the pressure, and also in a combination of these factors, since the operation of the rear control piston and rear support piston is independent of the manner of the regulation by which the flow of pressure fluid to and from the front control cylinder is controlled.

Figure 2:
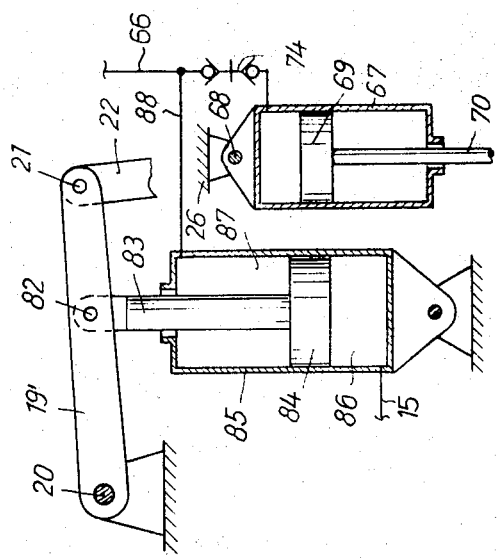

FIG. 2 illustrates a modification of the embodiment shown in FIGS. 1 and 1a. The lever 19' is mounted on shaft 20 on the tractor, and has a free end pivotally connected by pivot 21 with the front supporting link 22. Piston rod 83 of a control piston 84 is pivotally connected by pivot 82 with lever 19', and the control cylinder 87 is pivotally mounted on the tractor. Control piston 84 forms a front control cylinder chamber 86 on one side of control piston 84, and the rear control chamber 85 on the outer side of the same, penetrated by piston rod 83. Conduit 15 communicates with the front control chamber 86 for operating lever 19' and link 22, and conduit 88 connects the rear control chamber 85 with control conduit 66, and with check valve means 74 which opens into the rear support cylinder 67, in which rear support piston 69 with piston 70 is movable as described with reference to FIG. 1. The construction of FIG. 2 has the effect of combining pistons 77 and 17 in one piston, moving in one direction for displacing fluid out of chamber 87 when control piston 84 raises the leading end of implement 26, while lowering of control piston 84 into the front control chamber 86 causes flow of fluid from the rear support cylinder 67 into rear control chamber 85 in corresponding adjustment of the rear end of the implement, as described above with reference to FIGS. 1 and 1a.

Figure 3:
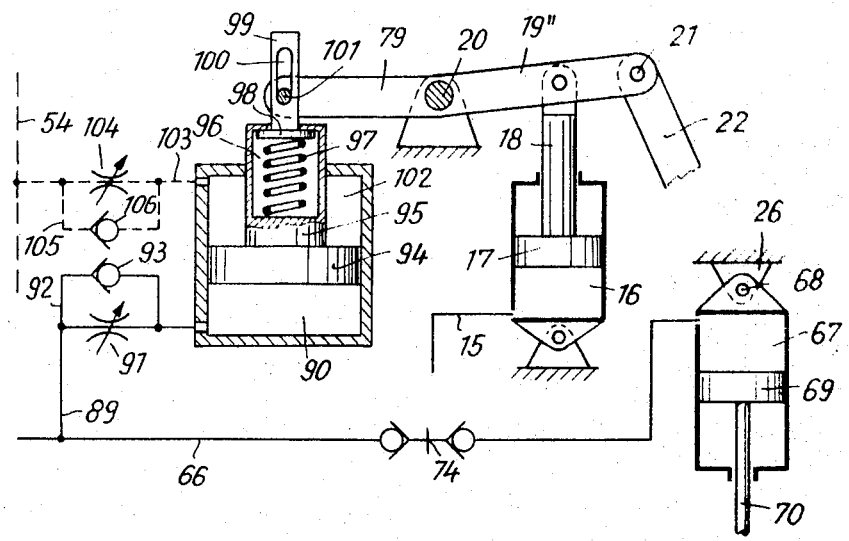
FIG. 3 is a fragmentary elevation, partly in section, illustrating another modification of the embodiment of FIG. 1.

When during plowing with a number of plow shares, a particularly narrow turning area along the field border is desired, an adjustable device for operating the rear control piston, corresponding to piston 77, is used. FIG. 3 shows a modification, and parts corresponding to parts of FIG. 1 and 1a, are indicated by link reference numerals. A rear support cylinder 67 receives pressure fluid from a control conduit 66 and check valve means 74 and contains a rear support piston 69 acting on the rear supporting means 71,73, described with reference to FIG. 1. A front control cylinder 16 contains a front control piston 17 connected by piston rod 18 with a lever 19'' mounted on a shaft 20 on the tractor, and operating a link 22 for raising and lowering the front end of the implement.

An arm 79 is not directly connected with a piston rod 76, as described with reference to FIG. 1, but has a pin 101 located in a slot 100 of a member 99 whose flange 98 abuts a spring 97 in the chamber 96 of a hollow piston rod 95 carrying the control piston 94 which forms a control chamber 90, and another chamber 102 on opposite sides thereof in the rear control cylinder. Between the rear end adjusting device 8, and a tubular coupling 74, a branch conduit 89 is connected to control conduit 66. Branch conduit 89 is connected by a conduit 92 containing a check valve 93, and a variable throttle 91, with the rear control chamber 90. Chamber 102, which contains the piston rod 95, is connected by conduit 103 with the return conduit 54. An adjustable throttle 104, and a parallel check valve 106 opening toward chamber 102, are provided in conduit 103.

The throttling means 91 and 104 are constructed preferably so that they can be adjusted by the operator independently of each other, and at any time, also during movement of the tractor with the implement. Before and during plowing, the implement can be quickly placed in a position parallel to the ground surface, and the depth of engagement of the plow shares 27 to 32 during plowing, can also be varied, which means that the plow is raised and lowered parallel to the ground surface. At the beginning and end of the field, a delayed raising or lowering of the implement, corresponding to the speed of movement of the tractor, can be obtained by the device of FIG. 3, so that each plow share 27 to 32 enters at the same distance from the field border into the ground, or is lifted out of the same.

When the operator actuates handle 47 of the presetting valve 50 for shifting the same out of a neutral position into the raising position, pressure fluid flows out of front control cylinder 16 back into container 2. Front control piston 17 moves into front control cylinder 16, so that piston rod 18 turns lever means 19' in clockwise direction about the shaft 20. The front end of the implement 26 is moved by links 22,24 downward, and the leading plow shares 27,28 enter the ground. At the same time, the arm 79 of lever 19'' turns in clockwise direction, and guide pin 101 moves freely in slot 100 in upward direction. The front control piston 94 can only slowly follow into the chamber 102, since fluid flows out of this chamber with a delay caused by the throttling means 104 through which the fluid flows into return conduit 54. Consequently, pressure fluid can also flow out of the rear support cylinder 67 through control conduit 66 into rear control chamber 90 with a delay, so that the rear end of the frame 26 only gradually moves downward, and the other plow shares 29 to 32 successively enter the ground at the same distance from the field border as the first plow share 27.

When the plow has reached the working depth corresponding to the selected pulling force, the presetting valve 50 is shifted to the neutral position, as described above, and the front control cylinder is closed. On the other hand, upon rapid lifting of the leading end of the implement at the end of the field, when pressure is supplied in the front control cylinder chamber 90, the fluid can flow only slowly to the rear support cylinder 67, since throttling means 91 delays the flow of pressure fluid out of the rear control chamber 90 and into rear support cylinder 67.

Furthermore, the excess pressure member 99 and spring 97 are designed so that they cannot be influenced by the load on the rear support wheel 73, and have the effect of a rigid connection. However, when the front control piston 17 is raised, and arm 79 turns in counterclockwise direction, the guide pin 101 presses the excess pressure member 99 against the force of spring 97 into the chamber 96 until the pressure on the end face of piston 94 of the control chamber 90 is overcome by the pressure which is exerted onto piston 94 by the excess pressure means 99,97. At this moment, spring 97 moves rear control piston 94 slowly into rear control chamber 90 while the excess pressure member 99 reamins in its position. The pressure fluid displaced out the rear control chamber 90 flows through throttling 91 with a delay into and through control conduit 66 into rear support cylinder chamber 67 whereby the trailing end of the implement is raised so that the rear plow shares 29 to 32 are successively pulled out of the ground at the same distance from the border of the field, as the leading plow shares 27,28 which are taken out of the ground by the movement of front control piston 17.

Figure 4:
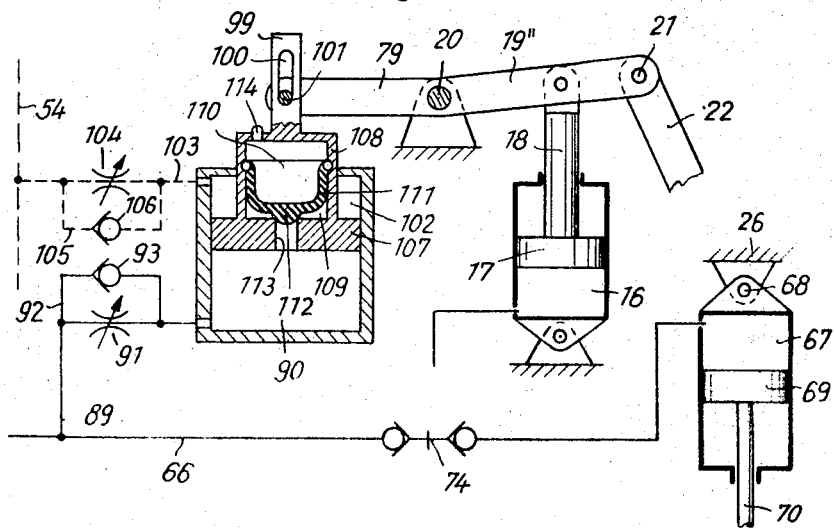
FIG. 4 is a fragmentary elevation, partly in section, illustrating a further modification of the device shown in FIGS. 2 and 3.

A further modification of the device shown in FIG. 3, is shown in FIG. 4, in which corresponding reference numerals are used for corresponding parts.

A rear control piston 107 is mounted in the rear control cylinder 90, and has a piston rod 108 which is constructed as a fluid accumulator. Two chambers 109 and 110 are provided in piston rod 108, and are separated by a membrane 111 which has at its center on the side limiting chamber 109, a thick portion forming a closure plug 112 which cooprates with a bore 113 in the rear control piston 107. Bore 113 connects chamber 109 with the rear control chamber 90. Chamber 110 is connected with a safety and filling valve 114.

When at the beginning of a plowing operation, the plow shares 27 to 32 are to be successively placed in the ground at the same distance from the field border, the presetting valve 50 is placed in its lowering position, as has been described above, in which lowering valve 58 is open, and pressure fluid flows out of front control cylinder 16 into return container 2. The front control piston 17 moves in the front control cylinder 16, and turns lever 19(' in clockwise direction. The front end of frame 26 is lowered, so that the first plow shares 27,28 enter the ground. During the angular movement of the levers 19, arms 79 moves guide pin 101 in slot 100 freely out of its end position away from the rear control piston 107, since the gas pressure in chamber 110 is selected to be higher than the general pressure of the hydraulic apparatus. Consequently, the pressure exerted by the weight of the implement on the rear support piston 69, and thereby the pressure acting on the rear control piston 107, cannot press the plug 112 of the membrane 111 away from bore 113 into chamber 109. Pressure fluid is passed out the rear support cylinder 67 and can flow only slowly, corresponding to the pressure fluid flowing out of the chamber 102 through throttling means 104 to return conduit 54, and slowly enters the rear control chamber 90 while the rear control piston 107 follows guide pin 101 until the end of slot 100 adjacent rear control piston 107 again abuts pin 101 on arm 79.

The rear control piston 107 then reaches a position corresponding to the position of the front control piston 17, and corresponding to the level of the leading end of the implement. The rear support piston 69 in the rear support cylinder 67 also assumes the corresponding position, and the trailing end of frame 26 in the desired working position, in which the implement is parallel to the ground surface.

When the plow is raised at the end of the field out of the ground, pressure fluid is supplied, as described above, to the front control cylinder 16, and front control piston 17 is actuated to move by means of piston rod 18, the lever means 19'' with arm 79 is counterclockwise direction about shaft 20. Rear support piston 69 cannot immediately follow the rapid raising movement of the front control piston 17 and of the leading end of the implement, since pressure fluid flows only slowly through throttling means 91 to the rear support cylinder 67. Due to the angular movement of arm 79 of lever 19'', the rear control piston 107 moves into the rear control chamber 90, and due to the increase of the pressure in the rear control chamber 90, closure plug 112 is lifted from bore 113 and pressure fluid can enter the chamber 109 of the fluid accumulator 108, as long as the angular movement of arm 79 takes place. After ending of this movement, the gas in chamber 110 presses the pressure fluid out of chamber 109, in the same manner in which it enters through throttling means 91 and control conduit into rear support cylinder 67 so that the rear support piston and the rear end of the implement are raised with a delay so that the plow shares 27 to 32 are retracted from the ground at the same distance from the field border.

It will be understood that each of the elements described above, or two or more together, may also find a useful application in other types of hydraulic control apparatus for agricultural implements differing from the types described above.

While the invention has been illustrated and described as embodied in a hydraulic control apparatus for maintaining agricultural implement parallel to the ground surface by adjusting rear support means whenever front support means of the implement are adjusted, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In combination with a tractor and an agricultural implement drawn by the tractor, a hydraulic control apparatus for maintaining the implement parallel to the ground surface, comprising movable rear supporting means mounted on the trailing end of said implement for supporting the same on the ground for up and down movement; hydraulic rear support cylinder means and piston means mounted on said implement, one means of which includes a movable member for operating said rear supporting means to raise and lower said trailing end; movable front supporting means mounted on said tractor for supporting the leading end of said implement on said tractor for up and down movement; control cylinder means and control piston means on said tractor forming a rear control chamber and a front control chamber, said control piston means being operatively connected with said front supporting means; and a hydraulic control device on said tractor including a source of pressure fluid, first control conduit means connecting said source with said front control chamber, second control conduit means connecting said rear control chamber with said rear support cylinder means, and manually operated front control valve means in said first control conduit means operable to supply pressure fluid to, and discharge fluid from said front control chamber so that said control piston means is operated to actuate said front supporting means to raise and lower, respectively, said leading end of said implement, said front supporting means acting on said control piston means to vary the volume of said rear control chamber for supplying fluid to, and receiving fluid from said rear support cylinder means through said second control conduit so that said movable member operates said rear supporting means whereby said leading and trailing ends are simultaneously raised and lowered, and said implement remains parallel to the ground surface.

2. Hydraulic control apparatus as claimed in claim 1 wherein said control cylinder means includes a front control cylinder and a rear control cylinder; wherein said control piston means includes a front control piston located in said front control cylinder and forming said front control chamber in the same, a rear control piston located in said rear control cylinder and forming said rear control chamber in the same; and linkage means mounted on said tractor connecting said front and rear control pistons with said front supporting means and with each other so that when the volume of said front control chamber increases or decreases, the volume of said rear control chamber decreases or increases, respectively.

3. Hydraulic control apparatus as claimed in claim 2 wherein said front and rear control pistons have piston rods; wherein said linkage means include a lever mounted on said tractor for angular movement about an axis and being pivotally connected with said piston rods at two spaced points, and link means connecting said lever with said front supporting means.

4. Hydraulic control apparatus as claimed in claim 1 wherein said control piston means is located in said control cylinder means forming on opposite sides thereof siid front and rear control chambers so that when the volume of said front control chamber increases or decreases, the volume of said rear control chamber decreases or increases, respectively; wherein said control piston means has a piston rod projecting out of said control cylinder means; and linkage means connecting said piston rod with said front supporting means.

5. Hydraulic control apparatus as claimed in claim 4 wherein said linkage means include a lever having one end mounted on said tractor for angular movement about an axis, link means connecting the other end of said lever with said front supporting means; and pivot means connecting said piston rod with said lever.

6. Hydraulic control apparatus as claimed in claim 1 comprising a hydraulic rear end adjusting device including manually operated rear end control valve means in said conduit means operable to supply pressure fluid to, and to discharge fluid from said rear support cylinder means for actuating said movable member.

7. Hydraulic control apparatus as claimed in claim 6 wherein said rear end control valve means includes a valve slide means and a handle for operating said valve slide means between a neutral position for closing said rear support cylinder means, a raising position for supplying pressure fluid to said rear support means, and a lowering position for discharging fluid from said rear support cylinder means.

8. Hydraulic control apparatus as claimed in claim 7 comprising a pump having a pressure conduit means and a return means; wherein said pressure conduit means communicates with said rear end adjusting device and said rear end control valve means, after communicating with said hydraulic control device and said front control valve means; and wherein rear end adjusting device and said control device have adjacent housings.

9. Hydraulic control apparatus as claimed in claim 1 wherein said control cylinder means includes a front control cylinder and a rear control cylinder; wherein said control piston means includes a front control piston located in said front control cylinder and forming said front control chamber in the same, a rear control piston located in said rear control cylinder and forming said rear control chamber in the same; and linkage means mounted on said tractor connecting said front and rear control pistons with said front supporting means and with each other so that when the volume of said front control chamber increases or decreases, the volume of said rear control chamber decreases or increases, respectively; adjustable throttle means in said second control conduit means; resilient means between said rear control piston and said linkage wherein said rear control piston forms another chamber on the side thereof remote from said rear control chamber; and a discharge conduit connected with said other chamber for discharging fluid from the same at low pressure.

10. Hydraulic control apparatus as claimed in claim 9 wherein said rear control piston has a hollow piston rod in said other chamber projecting out of the same and being connected with said linkage means; and wherein said resilient means include a spring located in said hollow piston rod.

11. Hydraulic control apparatus as claimed in claim 9 wherein said resilient means include a hydraulic accumulator.

* * * * *